United States Patent
Lee

(10) Patent No.: US 9,864,242 B2
(45) Date of Patent: *Jan. 9, 2018

(54) DISPLAY DEVICE

(71) Applicant: SAMSUNG DISPLAY CO., LTD., Yongin-si, Gyeonggi-do (KR)

(72) Inventor: Daegeun Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/975,456

(22) Filed: Dec. 18, 2015

(65) Prior Publication Data

US 2016/0306213 A1   Oct. 20, 2016

(30) Foreign Application Priority Data

Apr. 14, 2015   (KR) .................. 10-2015-0052447

(51) Int. Cl.
*G02F 1/1345*   (2006.01)

(52) U.S. Cl.
CPC ...... *G02F 1/13452* (2013.01); *G02F 1/13454* (2013.01); *G02F 2001/13456* (2013.01)

(58) Field of Classification Search
CPC ........... G02F 1/13452; G02F 1/136286; G02F 1/1368; H01L 23/49816
See application file for complete search history.

(56) References Cited

U.S. PATENT DOCUMENTS

| 6,093,630 | A  | * | 7/2000  | Geffken ................ H01L 23/525 228/180.21 |
| 6,297,563 | B1 | * | 10/2001 | Yamaha .................. H01L 24/03 257/750 |
| 6,297,868 | B1 |   | 10/2001 | Takenaka et al. |
| 6,552,419 | B2 | * | 4/2003  | Toyosawa ......... H01L 23/49572 257/668 |
| 7,102,223 | B1 | * | 9/2006  | Kanaoka ............. H01L 23/3114 257/698 |
| 7,649,608 | B2 | * | 1/2010  | Yim .................... G02F 1/13452 349/149 |
| 2009/0253233 | A1 |   | 10/2009 | Chang et al. |
| 2014/0029226 | A1 | * | 1/2014  | Abe ........................ H05K 1/111 361/773 |
| 2016/0203787 | A1 | * | 7/2016  | Park ........................ G09G 5/00 345/206 |

FOREIGN PATENT DOCUMENTS

| JP | 2001-358165 A |   | 12/2001 |
| JP | 2009-135447 A | * | 6/2009 |
| KR | 2000-0035587 A |   | 6/2000 |
| KR | 10-2013-0053280 A |   | 5/2013 |

* cited by examiner

*Primary Examiner* — Dung Nguyen
(74) *Attorney, Agent, or Firm* — Lewis Roca Rothgerber Christie LLP

(57) ABSTRACT

A display device includes: a display panel including a display area and a non-display area; a at least one pad in the non-display area of the display panel; a driving chip connected to the at least one pad, the driving chip including a driving circuit and at least one bump therein, wherein the at least one bump has an inclined surface facing toward a central portion of the driving chip.

14 Claims, 5 Drawing Sheets

DISPLAY DEVICE

CROSS-REFERENCE TO RELATED APPLICATION

This application claims priority to and the benefit of Korean Patent Application No. 10-2015-0052447, filed on Apr. 14, 2015, with the Korean Intellectual Property Office (KIPO), the disclosure of which is incorporated herein in its entirety by reference.

BACKGROUND

1. Field

Aspects of embodiments of the present invention relate to a display device, and more particularly, to a chip on plastic (COP) type display device.

2. Description of the Related Art

Embodiments of the present invention are directed to a liquid crystal display (LCD) device, in more particular, to a COP type LCD device.

The LCD device may display image information utilizing an electro-optical property of liquid crystal molecules injected into a liquid crystal panel provided therein. The LCD device may be advantageous over electronic products including a cathode ray tube (CRT) in that it has low power consumption, light weight, and a small volume. Accordingly, the LCD device may be used in a wide range of applications, such as a display device of a portable computer, a monitor of a desk top computer, and a monitor of an image display device displaying a high-definition image.

The LCD device may be generally divided into an LCD panel assembly and a backlight assembly. The LCD panel assembly may include: an LCD panel formed by injecting liquid crystal materials having dielectric anisotropy between a thin film transistor (TFT) substrate and a common electrode substrate; driving chips applying driving signals to each of a gate line and a data line formed on the LCD panel; a printed circuit board transmitting data (e.g., predetermined data) and control signals to the driving chip, and a flexible printed circuit board connecting driving chips to each other. The LCD panel assembly may be coupled to the backlight assembly, which includes a lamp assembly and various optical sheets, to thereby constitute an LCD device.

On the TFT substrate of the display panel there may be a gate pad for receiving a scan voltage from the driving chip, a gate wiring including a gate line and a gate electrode for transmitting the scan voltage, a data pad for receiving a signal voltage from the driving chip, and a data wiring for transmitting a data voltage to a pixel electrode through a source electrode and/or a drain electrode. On the gate line and the data line, the pixel electrode is formed for each pixel, and the TFT connected to the gate line, the data line, and the pixel electrode may be formed for each pixel.

In order to connect the gate pad and the data pad of the TFT display panel to the driving chip, a bump, which may be respectively connected to the gate pad and the data pad, is formed on a chip pad of the driving chip.

The driving chips formed with the bump may be respectively connected to the gate pad and the data pad in the following manner: an electrode of the driving chip disposed outside of the LCD panel may be connected to a pad of an insulating substrate provided in the gate pad and the data pad, using a film attached with a metal line in a tape automated bonding (TAB) method; or the driving chip may be directly mounted on the insulating substrate in a chip on glass (COG) method.

Herein, in the COG method, the driving chip may be attached to the insulating substrate only using the bump of the driving chip and an anisotropic conductive film (ACF).

However, in the COG method, organic insulating layers and the like are stacked as a protection layer so as to protect a driving element such as a TFT of an organic light emitting diode (OLED) display device, and thus compression defects may occur when connecting a bump and the like to a pad unit due to a step difference between the pad unit, below which a metal layer is disposed, and portions apart from the pad unit.

In particular, recently, a flexible OLED display device has drawn attention as a flat panel display device of the next generation, which is made of a flexible material, such as a flexible glass substrate or plastic, and is capable of performing its display function even when being bent like a piece of paper.

In a case where the flexible OLED display device retains its curved shape, however, a crack may appear on the insulating layer protecting the TFT, thus causing a defect in the driving element.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Embodiments of the present invention are directed to a display device capable of reducing a compression defect occurring in a compression process of a substrate and a driving chip and suppressing crack formation in an insulating layer.

According to an embodiment of the present invention, a display device includes: a display panel having a display area and a non-display area; at least one pad in the non-display area of the display panel; and a driving chip connected to the at least one pad, the driving chip comprising a driving circuit and at least one bump therein. The at least one bump may have an inclined surface facing toward a central portion of the driving chip.

The at least one pad may include: a plurality of first pads and second pads; and a pad electrode on the pad.

The display device may further include an anisotropic conductive film (ACF) on the pad electrode, the ACF comprising a plurality of conductive balls.

The display device may further include a printed circuit board connected to an end portion of the display panel.

The first pad may be configured to apply a signal to the display area, and the second pad may be configured to receive a signal from the printed circuit board.

The pad electrode may include a transparent conductive material.

The at least one bump may include first and second bumps coupled to the first and second pads, respectively, and the pad electrode and the first and second bumps may be connected to each other by the conductive balls.

The display device may further include a pair of substrates facing each other; and a liquid crystal layer between the pair of substrates.

The display device may further include: a gate wiring and a data wiring crossing each other in the display area; a thin film transistor (TFT) formed at crossing region between the gate wiring and the data wiring; and a pixel electrode connected to the TFT.

The first pad may be connected to a gate pad extending from the gate wiring or connected to a data pad extending from the data wiring.

The bump may include: an insulating layer; and a metal layer on the insulating layer.

The first bump may be configured to output a signal to the first pad, and the second bump may be configured to input a signal to the driving circuit.

The first bump and the second bump may each have a cross section having a curved shape.

The first bump and the second bump may each have a cross section having a polygonal shape.

According to aspects of embodiments of the present invention, deformation of a display panel occurring in a compression process may be reduced, and thereby compression defects and crack formation of an insulating layer may be mitigated or prevented.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the present disclosure of invention will be more clearly understood from the following detailed description taken in conjunction with the accompanying drawings, in which.

DETAILED DESCRIPTION

Figure 1A:
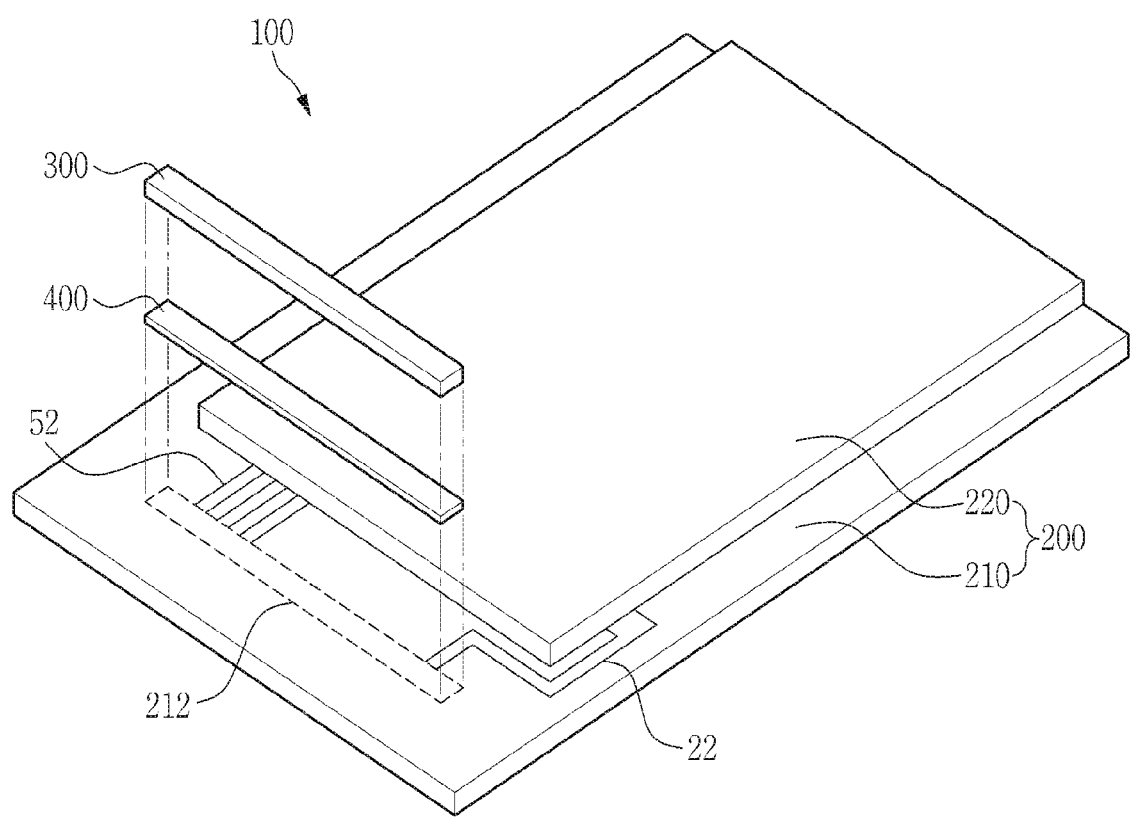
FIG. 1A is a perspective view illustrating a display device according to one embodiment of the present invention.

Aspects and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims and equivalents thereof. Therefore, well-known constituent elements, operations and techniques are not described in detail in the embodiments in order to prevent the present invention from being obscurely interpreted. Like reference numerals refer to like elements throughout the specification.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

According to one embodiment, a display device includes: a display panel including a display area and a non-display area; a plurality of first pads and second pads respectively disposed on both sides of the non-display area of the display panel, the plurality of first pads and second pads opposing each other and respectively arranged in a line; a pad electrode disposed on the first and second pads; an anisotropic conductive film (ACF) disposed on a portion covering the first and second pads and including a plurality of conductive balls; a driving integrated circuit (IC) disposed on a portion covering the ACF and generating a signal for driving the display area to transmit the signal to the first and second pads through the conductive balls, and a plurality of first and second bumps respectively arranged, corresponding to the first and second pads, on both sides of the driving IC in a line and respectively connected to the first and second pads opposing each other through the conductive ball. The first and second bumps may have an inclined surface on surfaces disposed inwardly of the driving chip, that is, surfaces of the first and second pads that face each other.

Hereinafter, embodiments of the present invention will be described in detail with reference to the accompanying drawings.

FIG. 1 is a perspective view illustrating a display device 100 according to one embodiment of the present invention.

Referring to FIG. 1, the display device 100 according to one embodiment includes a display panel 200 configured to display an image, a driving chip 300 driving the display panel 200, and an ACF 400 fixing the driving chip 300 to the display panel 200.

The display device 100 may be manufactured through the following processes: a pre-compression process of the ACF 400 to a pad unit 212 of the display panel 200; a pre-compression process of the driving chip 300 onto the ACF 400; and a primary compression process of the driving chip 300 thereto.

The display device 100 may include a curved-type display panel, but alternatively may include a flexible display panel that is bendable. Hereinafter, the display panel 200 according to the exemplary embodiment will be described with respect to the flexible display panel, but embodiments of the present invention are not limited thereto.

Hereinafter, aspects of exemplary embodiments of the present invention will be described in more detail with reference to accompanying drawings.

First, the display panel 200 will be described further hereinbelow.

The display panel 200 may display an image in response to a driving signal applied via the driving chip 300. The display panel 200 may include the pad unit 212 on which conductive pads are formed for connection with the driving chip 300.

The display panel 200 may include a first substrate 210 formed with the pad unit 212, a second substrate 220 opposing the first substrate 210 and coupled thereto, and a liquid crystal layer interposed between the first substrate 210 and the second substrate 220.

The first substrate 210 may be a thin film transistor (TFT) substrate on which the TFTs, which serve as a switching element, are formed in a matrix form (or layout). As an example, the first substrate 210 may include a glass material. A data line and a gate line may be connected to a source terminal and a gate terminal of the TFT, respectively. Further, a pixel electrode formed of a transparent conductive material may be connected to a drain terminal of the TFT.

The first substrate 210 may include a plastic material, which is easily deformed by heat. As an example, the first substrate 210, in particular, may be formed of polyether sulfone (PES) that has excellent ultraviolet (UV) light transmittance.

A pad electrode may be disposed on the pad unit 212 to electrically connect with a flexible printed circuit (FPC) having a film shape. Signals are externally input through the FPC. The pad electrode, a power supply line, a gate driving integrated circuit (IC), and a data driving IC may be connected to the pad electrode through a power link wiring, respectively.

The pad electrode may be formed of a transparent conductive material. As an example, the pad electrode may include indium-tin oxide (ITO), indium zinc oxide (IZO), and the like, which are transparent.

Referring to FIG. 1, the gate and data driving ICs may be connected to the gate and data wirings in a pixel region through gate and data signal link wirings, respectively.

Further, a storage electrode line may be formed on the same layer as a layer on which a gate line 22 is disposed. The storage electrode line may overlap the drain electrode of a data line 52 (to be described in more detail below), to form a storage capacitor (or a storage capacitance).

Herein, the gate line 22, the gate electrode, and the gate pad may be collectively referred to as the gate wiring. The gate wiring and the storage electrode line may be formed into a single-layer structure or into a multi-layer structure including two or more layers. In a case where the gate wiring and the storage electrode line have a single layer structure, the layer may include chromium (Cr) or a chromium (Cr) alloy, molybdenum (Mo) or a molybdenum (Mo) alloy, aluminum (Al) or an aluminum (Al) alloy, silver (Ag) or a silver (Ag) alloy. Further, in a case where the gate wiring and the storage electrode line have a double-layer structure, at least a layer of the two layers may be formed of a low-resistance metal material.

A gate insulating layer formed of silicon nitride and the like may be formed above the gate wiring and the storage electrode line. A semiconductor pattern formed of a semiconductor including amorphous silicon and the like may be formed above the gate insulating layer, corresponding to the gate electrode. Further, ohmic contact patterns (e.g., ohmic contact layers) formed of amorphous silicon doped with impurities at high concentration may be formed above the semiconductor pattern.

In addition, a data electrode may be formed on the gate insulating layer, the data electrode including the data line 52 formed to intersect (or cross) the gate line 22 in a crossing region, a source electrode extending from the data line 52 to contact one of the ohmic contact layers, and a drain electrode separated from the source electrode to contact another of the ohmic contact layers. Further, a data pad may be formed on an end portion of the data line 52 to transmit a signal voltage applied from an external IC to the data line 52.

The data line 52, the data electrode, and the data pad may be collectively referred to as the data wiring. The data wiring may be formed into a single-layer structure or into a multi-layer structure including two or more layers, as in the gate wiring.

Herein, the gate electrode, the semiconductor pattern, the source electrode, and the drain electrode may constitute a TFT, and the TFT may drive a switching element.

A protection layer formed of silicon nitride or silicon oxide may be formed above the data wiring. In the protection layer, a contact hole exposing the drain electrode, a contact hole exposing the gate pad, and a contact hole exposing the data pad may be formed.

Figure 1B:
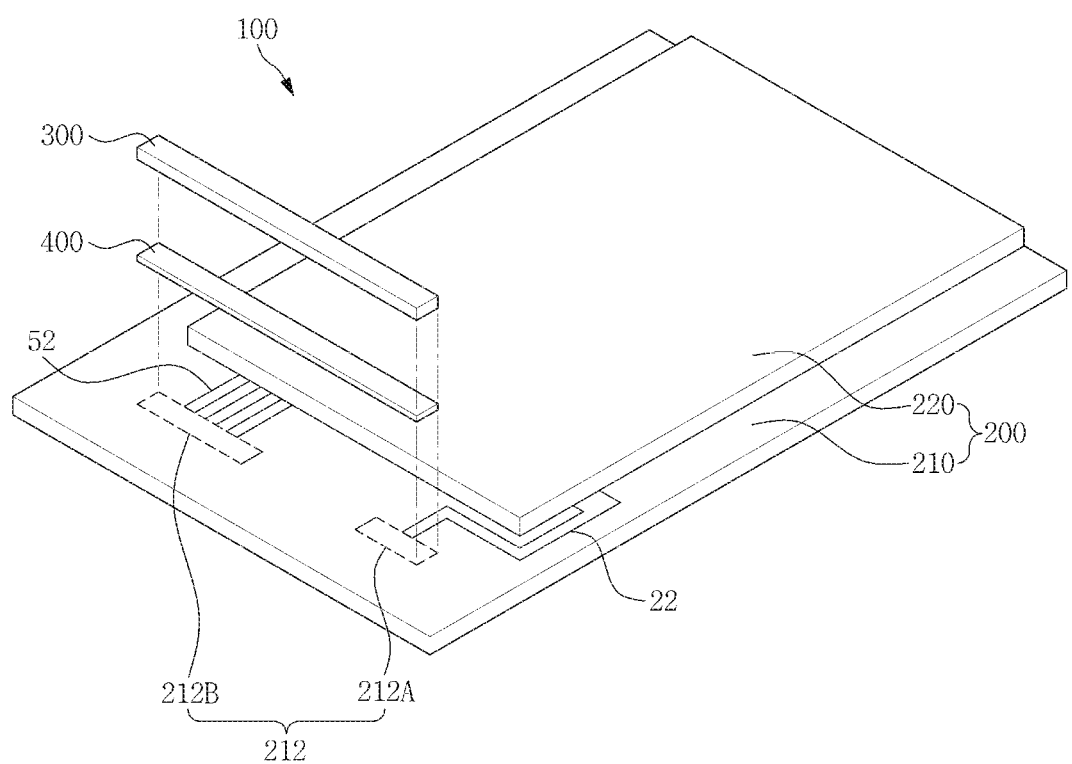
FIG. 1B is a perspective view illustrating a display device according to one embodiment of the present invention.

As shown in FIG. 1B, the pad unit 212 may include a first pad 212A and a second pad 212B. The first pad 212A—and the second pad 212B may be formed over the contact hole exposing the gate pad and on the contact hole exposing the data pad, respectively. The first pad 212A—may be electrically connected to a chip pad of the driving IC to transmit a scan voltage applied from the driving IC to the gate pad, and the second pad 212B may be electrically connected to the chip pad of the driving IC to transmit a signal voltage applied from the driving IC to the data pad. According to one embodiment, the first pad 212A—is connected to the gate pad and the second pad 212B is connected to the data pad, but embodiments of the present invention are not limited thereto. In some embodiments, the first pad 212A—is connected to the data pad and the second pad 212B is connected to the gate pad.

In a case where a signal is externally input to a power supply line, and the gate and data driving ICs through the pad electrode, the gate and data driving ICs may supply a scan signal and a data signal to the gate line 22 and the data line 52, respectively.

Accordingly, when a signal is input through the gate line 22, a switching TFT may be turned on in each pixel region, and a signal applied to the data line 52 may be transmitted to a gate electrode of a driving TFT to turn on the driving TFT, and thereby an organic light emitting diode (OLED) may emit light in each pixel.

The second substrate 220 may be disposed opposite (or facing) the first substrate 210. The second substrate 220 may be a color filter substrate on which red, green and blue pixels RGB may be formed in a thin film form to impart colors. As an example, the second substrate 220 may include a glass material. A common electrode formed of a transparent conductive material may be formed on the second substrate 220.

In the display panel 200 having the above-described structure, in a case where the TFT is turned on by a power applied to the gate terminal thereof, an electric field may be formed between the pixel electrode and the common electrode. Due to the electric field, liquid crystal molecules of the liquid crystal layer between the first substrate 210 and the second substrate 220 may be rearranged, and a level of transmittance of light passing through the liquid crystal molecules may be changed in accordance with the change in arrangement of the liquid crystal molecules, thus displaying an image of a desired gray scale.

Hereinafter, the driving chip 300 will be described.

Figure 2:
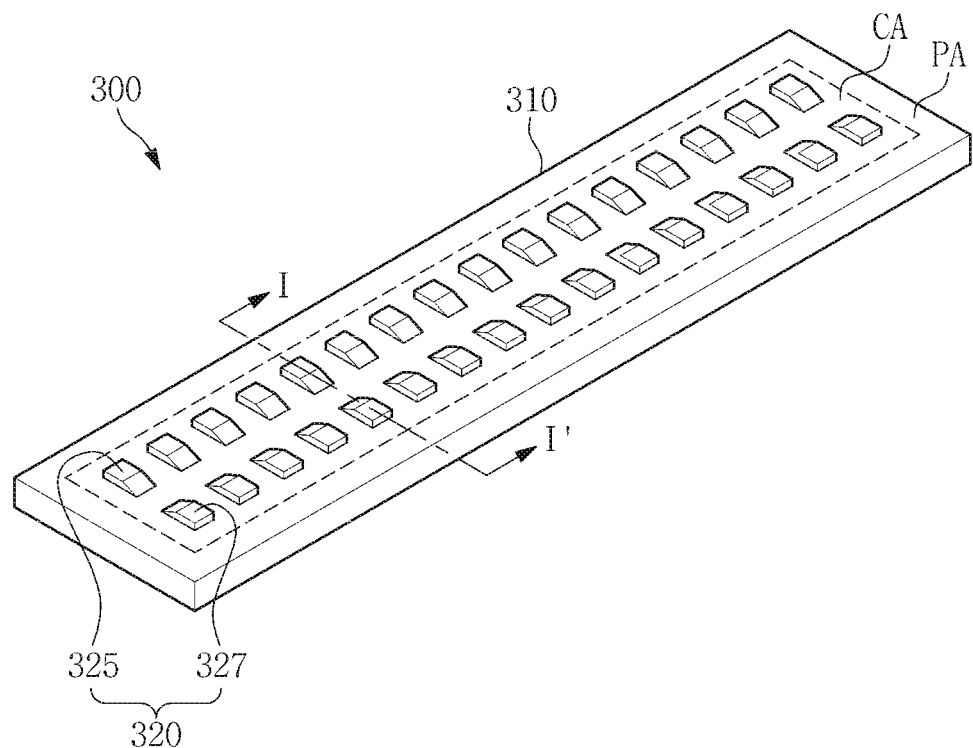
FIG. 2 is a detailed perspective view illustrating a driving chip of FIG. 1.
Figure 3:
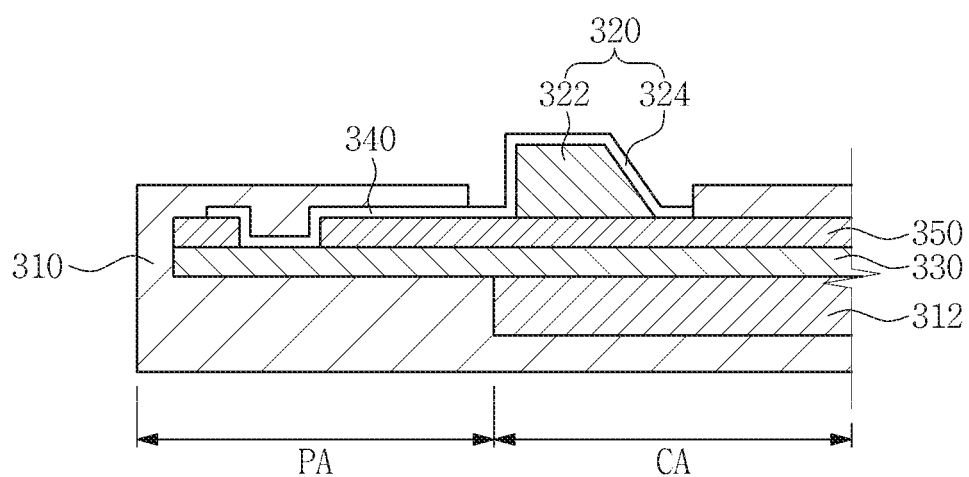
FIG. 3 is a cross-sectional view taken along line I-I' of FIG. 2.

FIG. 2 is a detailed perspective view illustrating the driving chip 300 of FIG. 1; and FIG. 3 is a cross-sectional view illustrating the driving chip 300 taken along line I-I' of FIG. 2.

Referring to FIGS. 2 and 3, the driving chip 300 may include a body 310 and a bump (or bumps) 320 protruding from the body 310.

The driving chip 300 may be coupled to the pad unit 212 of the display panel 200 using the ACF 400. The driving chip 300 may convert an externally received image signal to a driving signal for driving the display panel 100, and may apply the driving signal to the display panel 100 at a proper timing.

Referring to FIG. 3, a driving circuit 312 may be provided within the body 310 to process an image signal, externally applied thereto, into a driving signal for driving the display panel 100. The driving circuit 312 may be formed through a semiconductor process.

An exterior portion of the body 310 may be formed of an insulating material so as to protect the driving circuit 312.

The driving chip 300 may include a circuit area CA corresponding to a portion (along a direction parallel to the driving chip) in which the driving circuit 312 is formed and a peripheral area PA surrounding (along a direction parallel to the driving chip) the circuit area CA. The bumps 320 may be formed in a portion corresponding to the circuit area CA to reduce the size of the driving chip 300.

Each of the bumps 320 may include an insulating layer 322 protruding from the body 310 to have a height (e.g., a predetermined height) and a metal layer 324 surrounding the insulating layer 322.

The insulating layer 322 may include a material having a level (e.g., a predetermined level) of elasticity, so as to be stably coupled to the display panel 200. For example, the insulating layer 322 may include polyimide (PI).

The metal layer 324 may include a metal material having excellent (e.g., high) conductivity so as to allow electric connection with the display panel 200. For example, the metal layer 324 may include gold (Au), copper (Cu), and nickel (Ni), but embodiments of the present invention are not limited thereto.

The driving chip 300 may be connected to the driving circuit 312 within the body 310, and may further include a pad layer 330 extending to the peripheral portion PA and a metal wiring 340 electrically connecting the pad layer 330 and the metal layer 324.

The pad layer 330 may include a conductive material for electrically connecting the driving circuit 312 and the bump 320. For example, the pad layer 330 may include aluminum (Al).

An end portion of the metal wiring 340 may be electrically connected to the pad layer 330 in the peripheral portion PA, and another end portion of the metal wiring 340 may be electrically connected to the metal layer 324 of the bump 320. The metal wiring 340 may be formed of, for example, gold (Au). The metal wiring 340 and the metal layer 324 may include the same metal material, and may be formed concurrently (e.g., simultaneously).

The driving chip 300 may further include a protection layer 350 to protect the pad layer 330. The metal wiring 340 may be electrically connected to the pad layer 330 through an aperture of the protection layer 350.

The bumps 320 may be disposed on the body 310, and the bumps 320 may include a first bump (or first bumps) 325 and a second bump (or second bumps) 327. The first bump 325 may output a signal to the first pad, and the second bump 327 may input a signal to the driving IC.

According to one embodiment, the bump 320 may have an inclined surface at an inner side surface of the bump 320 (e.g., the inclined surface may be located on a side of the bump facing toward a central portion of the driving chip 300). That is, the inclined surface may be formed at surfaces of the first bump 325 and the second bump 327, which oppose (or face) each other. An angle of the inclined surface between the bump 320 and an upper surface of the body 310 may be less than or equal to 90 degrees, but embodiments of the present invention are not limited thereto.

Figure 4A:
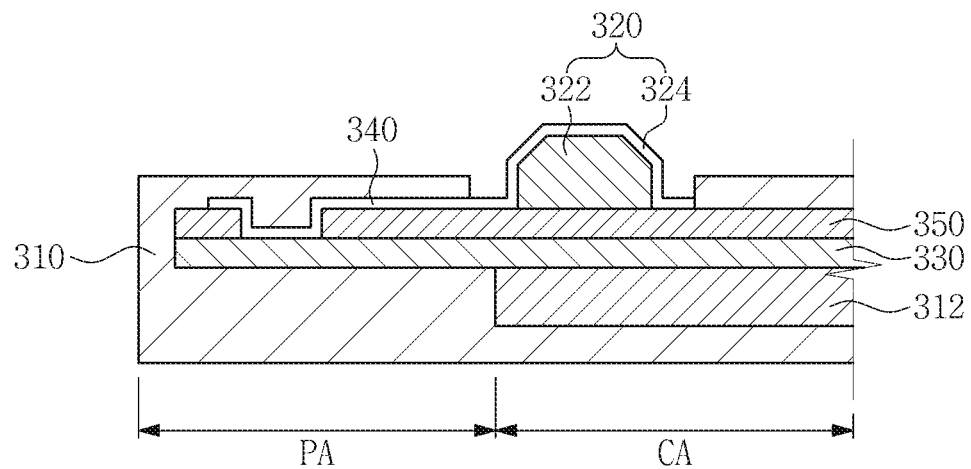
FIG. 4A is a cross-sectional view illustrating a driving chip according to one embodiment of the present invention.
Figure 4B:
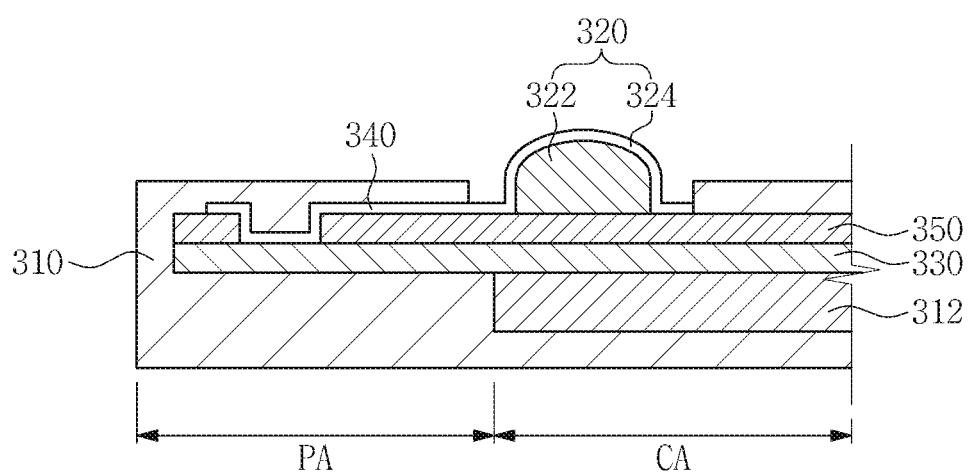
FIG. 4B is a cross-sectional view illustrating a driving chip according to one embodiment of the present invention.

The bump 320 may have a trapezoidal cross-section. However, embodiments of the present invention are not limited thereto, and, as illustrated in FIGS. 4A and 4B, a cross section of the bump 320 may have a curved shape or a polygonal shape.

The display panel 200 may be deformed during the following processes: the pre-compression process of the ACF 400 to the pad unit 212 of the display panel 200; the pre-compression process of the driving chip 300 to the ACF 400; and the primary compression process of the driving chip 300 thereto.

In a case where the display panel 200 is deformed in the compression process, the inclined surface of the bump 320 may serve to reduce or prevent the display panel 200 from being subject to much shock.

Hereinafter, the ACF 400 will be described.

Figure 5:
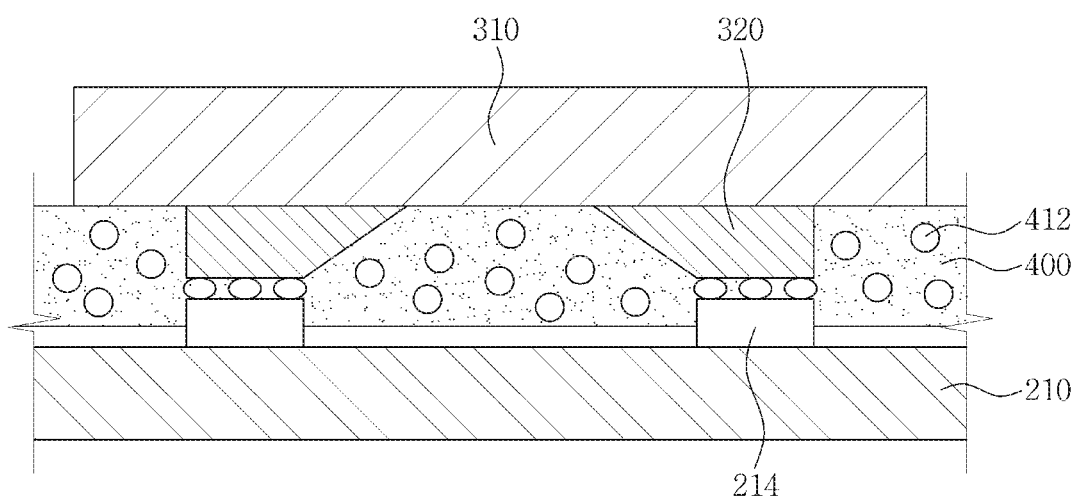
FIG. 5 is a cross-sectional view illustrating a coupling structure of a display panel and the driving chip of FIG. 1.

FIG. 5 is a cross-sectional view illustrating the ACF 400 according to an embodiment of the present invention.

Referring to FIG. 5, the ACF 400 may couple the driving chip 300 and the first substrate 210 to be electrically connected to each other. The ACE 400 may include a conductive ball 412. The ACF 400 may be a polymer adhesive having anisotropy, that is, having conductivity in a thickness direction and having insulating properties in a surface direction. By virtue of the anisotropy, an entire area of the ACF 400 may be concurrently (e.g., simultaneously) subject to the adhesion process, such that process efficiency may be enhanced.

The conductive balls 412 may be irregularly dispersed within the ACF 400, and may be deformed by externally applied pressure to electrically connect the driving chip 300 and the display panel 200. The conductive ball 412 may include a conductive particle itself or a polymer resin particle coated with a metal layer or may include the conductive particle or the particle coated with a metal layer that are coated with an insulating resin. For example, the metal layer may include nickel (Ni), gold (Au), and the like.

A diameter of the conductive ball 412 may vary based on an interval between the bump 320 which the conductive ball 412 is in contact with and the pad electrode 214. For example, the diameter of the conductive ball 412, in particular, may be in a range of about 3 μm to about 4 μm.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings.

What is claimed is:

1. A display device comprising:
   a display panel having a display area and a non-display area;
   at least one pad in the non-display area of the display panel; and
   a driving chip connected to the at least one pad, the driving chip comprising a driving circuit and at least one bump electrically connected to the driving circuit, the driving chip having a circuit area corresponding to a location of the driving circuit and a peripheral area surrounding the circuit area, the at least one bump being located in the circuit area,
   wherein the at least one bump has an inclined surface facing toward a central portion of the driving chip.

2. The display device of claim 1, wherein the at least one pad comprises:
   a plurality of first pads and second pads; and
   a pad electrode on the pad.

3. The display device of claim 2, further comprising an anisotropic conductive film (ACF) on the pad electrode, the ACF comprising a plurality of conductive balls.

4. The display device of claim 3, further comprising a printed circuit board connected to an end portion of the display panel.

5. The display device of claim 4, wherein a first pad of the first pads is configured to apply a signal to the display area, and
   a second pad of the second pads is configured to receive a signal from the printed circuit board.

6. The display device of claim 5, wherein the pad electrode comprises a transparent conductive material.

7. The display device of claim 6, wherein the at least one bump comprises first and second bumps coupled to the first and second pads, respectively, and
   the pad electrode and the first and second bumps are connected to each other by the conductive balls.

8. The display device of claim 7, further comprising:
   a pair of substrates facing each other; and
   a liquid crystal layer between the pair of substrates.

9. The display device of claim 8, further comprising:
   a gate wiring and a data wiring crossing each other in the display area;
   a thin film transistor (TFT) formed at a crossing region between the gate wiring and the data wiring; and
   a pixel electrode connected to the TFT.

10. The display device of claim 9, wherein the first pad is connected to a gate pad extending from the gate wiring or connected to a data pad extending from the data wiring.

11. The display device of claim 10, wherein the at least one bump comprises:
    an insulating layer; and
    a metal layer on the insulating layer.

12. The display device of claim 11, wherein the first bump is configured to output a signal to the first pad, and
    the second bump is configured to supply a signal to the driving circuit.

13. The display device of claim 12, wherein the first bump and the second bump each have a cross section having a curved shape.

14. The display device of claim 12, wherein the first bump and the second bump each have a cross section having a polygonal shape.

* * * * *